United States Patent [19]

Lee et al.

[11] 4,449,238
[45] May 15, 1984

[54] VOICE-ACTUATED SWITCHING SYSTEM

[75] Inventors: Byung H. Lee, Hazlet; John F. Lynch, Jr., Summit, both of N.J.

[73] Assignee: Bell Telephone Laboratories, Incorporated, Murray Hill, N.J.

[21] Appl. No.: 362,034

[22] Filed: Mar. 25, 1982

[51] Int. Cl.³ .............................................. H04M 3/56
[52] U.S. Cl. .............................. 381/110; 179/2 TS; 179/18 BC; 358/85
[58] Field of Search ............. 179/1 CN, 1 VC, 2 TS, 179/2 TV, 18 BC, 1 HF, 100 L; 370/62; 358/85; 381/56, 57, 80, 81, 110; 367/198

[56] References Cited

U.S. PATENT DOCUMENTS

| | | | |
|---|---|---|---|
| 3,601,530 | 8/1971 | Edson et al. | 179/2 TS X |
| 3,694,578 | 9/1972 | Reid | 179/1 CN |
| 3,730,995 | 5/1973 | Mathews | 179/1 |
| 3,755,625 | 8/1973 | Maston | 179/1 |

*Primary Examiner*—A. D. Pellinen
*Assistant Examiner*—W. J. Brady
*Attorney, Agent, or Firm*—S. R. Williamson

[57] ABSTRACT

A voice-actuated switching system selectively connects multiple microphones to an audio line in accordance with the output signal levels from each of the microphones. The state of each microphone is determined by its use and can exit in one of three states: selected, mixed, or off. The microphone with the greatest output signal level at any given time is considered in the selected state and is selected for connecting to the audio line with no loss. Those microphones in the mixed state have their output signal levels attenuated before being connected to the audio line. And those microphones in the off state have their outputs essentially disconnected from the audio line. The user of a microphone while in the mixed state can be heard along with the user of a microphone while in the selected state although at a lower level. Improved accuracy is obtained in the microphone selection process by comparing the microphone signals to each other and to a reference level that takes into account any offsets induced into the signals by the system. The system can accommodate any number of microphones.

36 Claims, 4 Drawing Figures

VOICE-ACTUATED SWITCHING SYSTEM

BACKGROUND OF THE INVENTION

1. Technical Field

This invention relates to audio systems and, more specifically, to systems for selectively connecting speech circuits to an audio line in response to voice signals.

2. Description of the Prior Art

Major companies are beginning to consider teleconferencing as a cost effective way of communicating among personnel at dispersed locations and thereby reduce the need for business travel. In a teleconferencing arrangement, a number of conferees at a location are placed in communication with a number of conferees at one or more remote locations via a telephone connection. The quality of the transmission between the separated groups of conferees is generally dependent upon the position of each conferee with respect to a microphone and loudspeaking device at each location. With a single microphone and loudspeaking device in the conference location room, the transmission is subject to degradation because some of the conferees are generally at a greater than optimum distance from the microphone and loudspeaking device.

It is well known to use a plurality of microphones appropriately spaced at each conferee location such as a conference room to improve the quality of the conference system. The microphone outputs are summed and the summed output is applied to the communication links between locations. In such an arrangement, each conferee can be within an acceptable distance from one of the microphones, whereby speech pickup is of relatively good quality. With all microphones turned on at one time, however, several undesirable effects occur. The total noise pickup is much greater than for a single microphone. The artificial reverberation effects occasioned by the delayed signal pickup from the more remote microphones severely lower the quality of the conference transmission. Further, electroacoustic instability can easily result from the plurality of the always turned on microphones. It is therefore desirable and known in the art to provide a switching arrangement which permits only that microphone closest to the talking conferee to be active so that reverberation and noise pickup are minimized.

Such an arrangement is commonly known as a "voting circuit." In the "voting circuit" arrangement, the loudest talker can capture control and lock out the other conferees at his location. This automatic switching between microphones responsive to the highest speech level microphones, however, may also result in transmission interruptions which adversely affect intelligibility and can result in unwanted interference occasioned by transient room noise. For example, a loud noise at one of the conference locations may completely turn off the controlling microphone. Further, since only one microphone is operative at a time, transfer of control from one microphone to another such as occasioned by the talking conferee moving from one position to another in a room location can result in speech transmission of varying quality, interruptions in transmission, and reverberation effects which vary with the talking conferee's position.

Various teleconferencing arrangements have been proposed and used heretofore for selecting a single microphone of a plurality of conferee microphones and for transmitting the signal from only the selected microphone. An example of such an arrangement is seen in U.S. Pat. No. 3,730,995, issued to M. V. Matthews on May 1, 1973. In this arrangement, each of a plurality of microphones is associated with a speech detector and a relay. In response to voice signals from one of the microphones, an associated speech detector activates its relay which connects the microphone to an audio line and generates a signal inhibiting the other relays. Another example is seen in U.S. Pat. No. 3,755,625, issued to D. J. Maston on Aug. 28, 1973. This patent discloses a multimicrophone-speakerphone arrangement using a comparator in combination with logic circuitry for selecting a microphone with the greatest output and connecting it to the speakerphone input while simultaneously disconnecting the other microphones. While these arrangements have been satisfactory in minimizing the degradation of the speech signals due to reverberation and noise pickup, it is nevertheless desirable to make the microphone selection technique appear to occur in as normal a manner as possible. That is, not only should the microphone voter recognize and respond to the loudest conferee in the room as do the other conferees, but it should also allow other conferees who speak simultaneously to be heard but at a lower level. And it is also desirable to avoid the syllabic clipping that occurs when a microphone turns on from the full off condition.

SUMMARY OF THE INVENTION

In accordance with the present invention, in a teleconferencing system a voice-actuated switching arrangement provides for the selecting of multiple microphones in accordance with the output signal levels from each of the microphones. The outputs of the microphones are combined and applied via a voice gate and bridge circuit to a telephone line. The state of each microphone is determined by its use and each can exist in one of three states: selected, mixed, or off. The microphone with the greatest output at any given time is considered in the selected state and is selected by the switching arrangement for connecting to the voice gate and bridge circuit with no loss. Those microphones whose outputs have exceeded a certain predetermined threshold level at least once during the conference, though not necessarily to the extent of having been in the selected state, are considered to be in the mixed state and have their outputs attenuated before being connected to the voice gate and bridge circuit. Once in the mixed state these microphones will only change between the mixed and selected states for the duration of the conference.

The off state is applicable to those microphones whose outputs have not exceeded the predetermined threshold level at least once during the conference and have their outputs essentially disconnected from the voice gate and bridge circuit. This state serves to avoid the additional noise from those microphones that would be present were they initially in the mixed state. Speaking into a microphone while in this state will cause the microphone to change either to the mixed or selected state depending upon the conferee's speaking level. Once activated it will also vary about these two states and not return to the off state. In addition to allowing other speaking conferees to be heard, the tri-state arrangement of the microphones avoid the syllabic clipping that would be apparent if the microphones were to change only between the selected and off states.

In accordance with the invention, another aspect thereof is directed to the voice-actuated switching arrangement for detecting the state of each of the multiple microphones. The arrangement simplifies and reduces the amount of circuitry used for "microphone voting" yet maintains a high level of accuracy in microphone selection. In achieving this, the arrangement incorporates a first and a second analog multiplexer and an analog demultiplexer for processing the speech signals from each of the multiple microphones. The first multiplexer samples at a moderately high frequency rate the signal on the microphones and also signal ground level for reference purposes. These signals are coupled via a single nonlinear amplifier onto the demultiplexer which is synchronized with the first multiplexer and is used for decoding the sampled speech signals. Multiple peak detectors are used to store the signals provided by the demultiplexer. The second multiplexer samples each of the peak detectors at a rate slower than the rate of the first multiplexer and the demultiplexer but sufficiently high enough to avoid syllabic clipping. Hence, accuracy in the microphone selection is enhanced by having these multiplexers and the demultiplexer provide interfacing through a common nonlinear amplifier for multiple peak detectors that contain both the signal envelope from each of the microphones and the ground reference level. And in providing this reference level along with the signals, the requirement of having a stable ground reference is avoided since temperature and component changes are accommodated and any offsets induced in the signals are compensated.

BRIEF DESCRIPTION OF THE DRAWING

The invention and its mode of operation will be more clearly understood from the following detailed description when read with the appended drawing in which.

DETAILED DESCRIPTION

Figure 1:
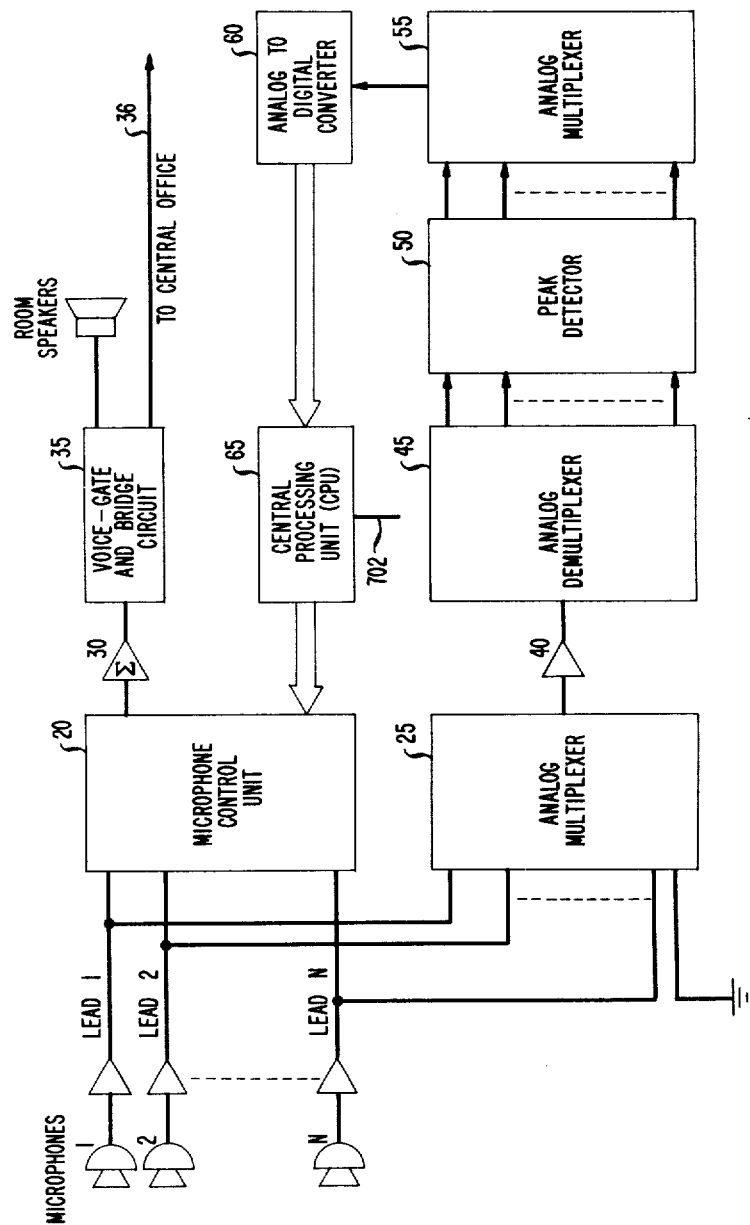
FIG. 1 is a block diagram of the voice-actuated switching system showing the major functional circuit components of the system and their general interconnection with each other in accordance with the present invention.

Referring now to FIG. 1 of the drawing, there is shown a functional block representation of a voice-actuated switching system operative in accordance with the principles of the invention. As shown, the switching system comprises multiple microphones 1, 2, and N that are each respectively connected via an associated amplifier to lead 1, lead 2, and lead N. These leads connect the multiple microphones with a microphone control unit 20 and an analog multiplexer 25. The microphone control unit 20 couples the microphone signals to a summing amplifier 30 where the signals are further amplified. From the amplifier 30 the signals are coupled to a voice gate and bridge circuit 35 which switches between a receive state wherein it couples incoming signals from the central office onto the room speakers and a transmit state wherein the microphone signals are coupled to a telephone line 36 for transmission to the central office. The voice gate and bridge circuit 35 continually compares the output signal of the summing amplifier 30 with the signal received from a remote location and determines which of the two is the larger. The larger signal is coupled through the voice gate and bridge circuit 35, and the smaller signal is further attenuated by this circuit to reduce speaker-to-microphone echoes.

The analog multiplexer 25 sequentially samples at a moderately high frequency rate all of the microphone signals and serially couples those signals to a nonlinear amplifier 40 which compresses somewhat the peak amplitude of the signals. Moreover, as part of the sampling routine the analog multiplexer 25 also samples the signal ground reference level and couples this signal to the nonlinear amplifier 40. Thus, through use of a single nonlinear amplifier, its parameters are made common both to the microphone signals and the ground reference level, and the resolution of the system is increased thereby. The required circuitry for the system is also minimized.

Coupled to the output of the nonlinear amplifier 40 is an analog demultiplexer 45 which operates in synchronism with multiplexer 25, and has the same number of outputs as multiplexer 25 has inputs. Demultiplexer 45 changes the serial data stream containing amplitudes of the sampled microphone signals and the signal ground reference level once again into a parallel data stream. These signals are all applied to a peak detector circuit 50 wherein the signal envelope for each microphone is stored. The multiple outputs of the peak detector 50 are sampled by an analog multiplexer 55 which combines the parallel data signals into a serial data signal for application to a analog-to-digital converter 60.

Operation of the analog multiplexer 55 is at a rate 100 times slower than the multiplexer 25 and demultiplexer 45. The advantage derived by this arrangement is that multiplexer 25 and demultiplexer 45 allow for a sufficiently rapid sampling rate to detect any fast changes in signal level upon the microphones while multiplexer 55 with its slower sampling rate allows for a reduced processing time in which to make any changes in the system dictated by the signal level changes on the microphones.

The analog-to-digital converter 60 couples the microphone signals and the signal ground reference level to a central processing unit (CPU 65). CPUs are commercially available. A CPU commercially available from Intel Corporation as Part No. 8085A can be used for CPU 65 with the proper programming. The voice switching system described in this invention uses approximately 50% of the processing capability of this CPU. The signals from the analog-to-digital converter 60 are compared both to each other and to the ground reference level in the CPU 65 to determine which signal is of the greatest magnitude. In that the ground reference level compared is that which is provided as an input to the multiplexer 25, the assurance of accuracy in the comparing of the signals is provided since any offsets or other circuit-induced or temperature-induced errors in the signals will also be present in the reference level. Thus the difference between the speech signal levels and the reference level yields a direct measure of the speech signal levels during the comparison process in the CPU 65.

In operation, a control signal is provided from the CPU 65 to the microphone control unit 20. This control signal allows the microphones to exist in one of three states: selected, mixed, or off. The microphone having the greatest sampled signal level on peak detector 50 is considered in the selected state and is selected by the microphone control unit 20 for connecting to the voice gate and bridge circuit 35 with no loss in its circuit path. Those microphones having signals that have exceeded a certain predetermined amplitude level on peak detector 50 at least once after the initiation of the conference are considered to be in the mixed state and have their output circuit paths attenuated before being connected to the voice-switched bridge 35. Those microphones that have not had a signal exceed the predetermined amplitude level at least once during the conference are essentially disconnected from the voice-switched bridge by the microphone control unit 20. Speaking into a microphone while in this state causes the microphone to change either to the mixed or selected state depending upon the conferee's speaking level into the microphone. For a different microphone to become selected, it must exceed the level of the presently selected microphone by 50%. Once activated, a microphone will only change between the mixed and selected state and not return to the off state during the conference.

Figure 2:
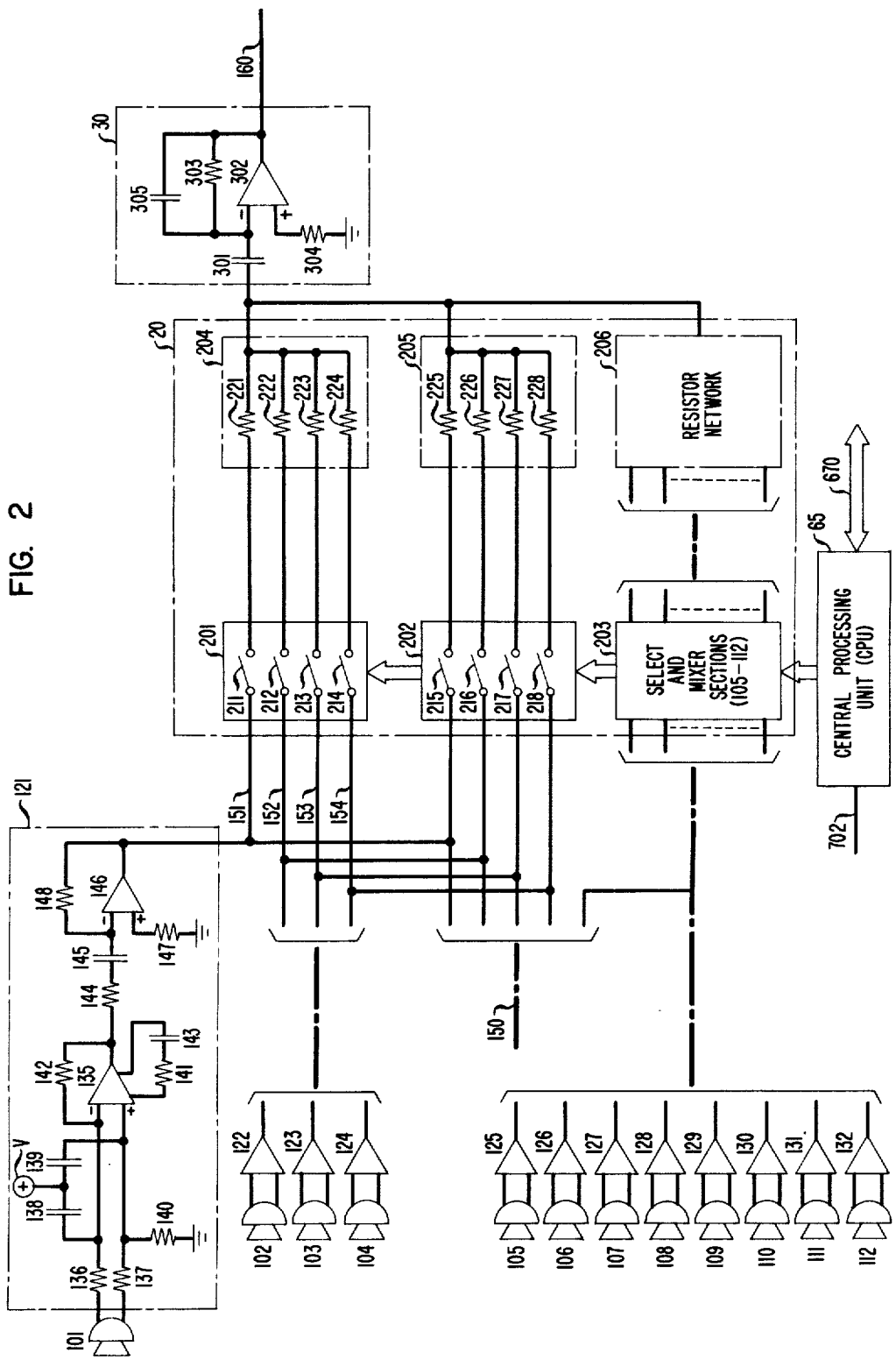
FIGS. 2 and 3 present a schematic diagram showing the detailed circuitry of an embodiment of the voice-actuated switching system.

Referring now to FIG. 2, there is shown a schematic diagram of part of the detailed circuitry of the voice-actuated switching system of FIG. 1. For illustration purposes, microphone channels 101 through 112 and their respectively associated amplifiers 121 through 132 are shown in this embodiment. It will become obvious to those skilled in the art that any number of microphones other than twelve can be utilized in practicing this invention. Hence it is not intended nor should the invention be construed as being limited to any particular number of microphones by this illustration. Preamplifiers 121 through 132 are identical in design and thus for simplicity only reamplifier 121 is shown and described in specific detail.

The output of microphone channel 101 is connected to the first of two operational amplifiers comprising preamplifier 121. The first amplifier 135, provides a balanced input for microphone channel 101 through resistors 136 and 137. And capacitors 138 and 139 are connected across this input and voltage level +V in order to suppress radio frequency demodulation in this first stage. The first amplifier 135, having associated components, resistors 140, 141, 142, and capacitor 143, amplify the output of microphone channel 101 and couple this signal to the second operational amplifier via resistor 144 and capacitor 145. This second operational amplifier 146, having associated components, resistor 147 and feedback resistor 148, further amplifies the output of microphone 101.

The output of the first preamplifier 121 is fed to a select section 201 and a mixer or unselect section 202 in the microphone control unit 20 and also on line 150 to the analog multiplexer 25 (shown in FIG. 3) to be later discussed. Under the control of the CPU 65, the microphone control unit 20 controls the selected, mixed or unselected and off states of the twelve microphone channels. Select section 201 and mixer section 202 are used for determining the selected and mixed states, respectively, of the first four microphone channels. For example, as earlier indicated, the output of preamplifier 121 on line 151 goes both to one of the four inputs of select section 201 and one of the four inputs of mixer section 202. When the microphone is considered in the off state, neither switch 211 in select section 201 or switch 215 in mixer section 202 are closed.

As the microphone output exceeds a predetermined amplitude threshold, the CPU 65 provides an activation signal that closes switch 215 in mixer section 202. This then places microphone channel 101 in the mixed state since the output of preamplifier 121 is coupled through switch 215 in mixer section 202 and then through resistor 225 in resistor network 205 and onto capacitor 301 in mixer amplifier 30. As the amplitude of microphone channel 101 increases to the point where it has the largest speech signal input, the CPU 60 then provides a control signal to select section 201 and causes switch 211 to close and switch 215 in mixer section 202 to open. In this state, microphone channel 101 is the selected channel and its output is coupled through switch 211 of select section 201, resistor 221 of resistor network 204 and onto capacitor 301 of mixer amplifier 30.

Control signals are provided by the CPU 65 on the bus to the microphone control unit 20 such that only one microphone channel can be in the selected state, the remainder being either in the off or mixed state. Thus, in the foregoing example and with reference to the illustrative embodiment showing the control unit switches 211 through 218 for the four microphones, while microphone channel 101 is in the selected state, microphone channels 102, 103, and 104 are necessarily in either the off or mixed state. Select and mixer sections 203 for channels 105 through 112 and accompanying resistor network 206 perform in the same manner for these channels, as do select section 201 and mixer section 202 and their respective resistor networks 204 and 205 for channels 101 through 104. In extending the foregoing example, microphone channels 105 through 112 are also necessarily in either the off or mixed state. It is seen, therefore, that the control unit 20 directs the output of each microphone preamplifier to two different inputs of the summing amplifier 30. One input is designed to have zero decibel of gain and the other 6 decibels of gain to the summing amplifier 30. This amplifier, which comprises operational amplifier 302 and associated components, resistors 303, 304, and capacitor 305, applies the output signal onto line 160 for coupling to the voice gate and bridge circuit 35 shown in FIG. 1.

Figure 3:
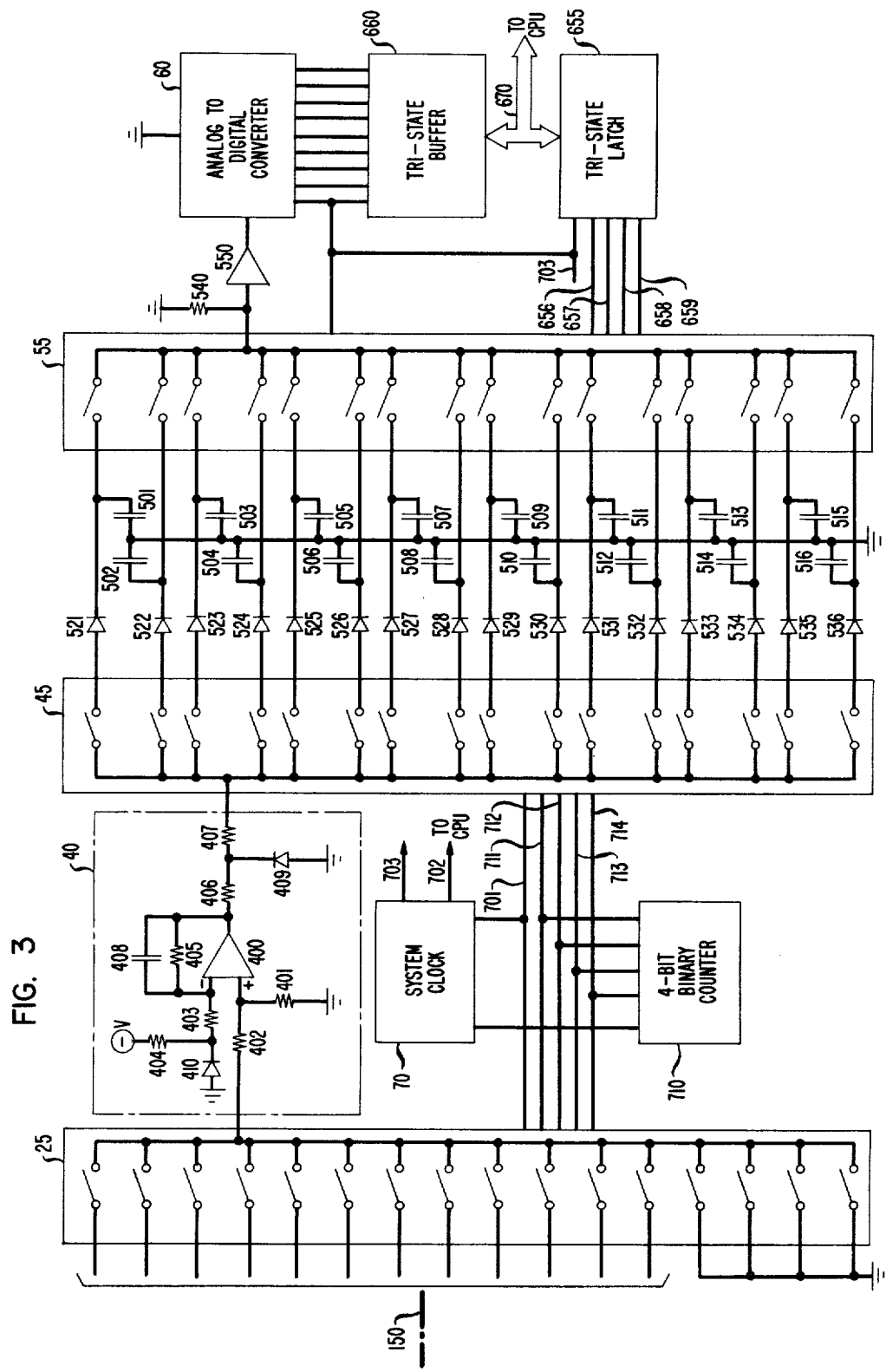

Referring now to FIG. 3, there is shown a schematic diagram of the remainder of the detailed circuitry of the voice-actuated switching system of FIG. 1. The output of each one of the microphone preamplifiers 121 through 132 (shown in FIG. 2) is coupled over line 150 to the input of analog multiplexer 25. This multiplexer serves as a microphone scanner and sequentially couples the output of each preamplifier to the input of a nonlinear amplifier 40. The scanning interval is set at 100 microseconds allowing 6.25 microseconds for each microphone channel. In addition to the twelve amplifier inputs provided to this multiplexer, another four inputs at signal ground reference level are provided.

The nonlinear amplifier 40 is shared commonly between the microphone channels and the inputs for signal ground reference level. This amplifier comprises operational amplifier 400, resistors 401 through 407, and capacitor 408. Diode 409 is also included for attenuation of the larger amplitude signals. The signals are also provided with a dc offset by diode 410 to compensate for a voltage drop caused by diodes in the peak detectors that are later described. The signal from the nonlinear amplifier 40 is provided to the analog demultiplexer 45 which changes the signal from a serial to a parallel form for applying to the peak detectors.

Each of the twelve microphone signals and the four ground reference signals are used for charging the peak detector capacitors 501 through 516. In the charging of peak detector capacitor 501, for example, a positive input charges this capacitor through resistor 407 and diode 521. As earlier indicated, diode 410 provides a dc offset necessary to compensate for the diode drop that has to be overcome in each peak detector. This is due to diodes 521 through 536. These diodes are inserted to limit the charging current flow to one direction in the peak detectors. The charging time constant for the peak detectors is 10 microseconds and the discharge time constant is 500 milliseconds. This discharge time constant is determined by resistor 540 and each capacitor in the peak detectors as they are sequentially connected by the analog multiplexer 55 to resistor 540 and a buffer amplifier 550.

The scanning interval of analog multiplexer 55 is set to scan all sixteen peak detectors every 10 milliseconds. This scanning interval is also set to recognize syllabic speech, i.e., catch the leading edge of the voice. Thus a decision as to whether a microphone is on or off is available to the system within 10 milliseconds. And since the average person can barely detect a clip in syllabic speech within 20 milliseconds, this sampling interval is sufficiently fast to avoid such detection.

Operation of the peak detecting and multiplexing part of the system might be better appreciated when considered in conjunction with the following example. If a person is talking with an energy content in his or her voice at around 500 Hertz with a 2 millisecond time period, and if a voter circuit performed sampling in real time, it is very possible the sampling could take place in the null of this person speaking. In the arrangement of this invention, the peak detectors are utilized to conveniently store speech signals obtained at a high sampling rate while the multiplexer 55 needs only to sample the envelope of the speech at a rate exceeding the detectable clipping rate.

Analog multiplexer 25 and analog demultiplexer 45 are synchronized through use of a system clock 70. An output of the system clock is used to drive a four-bit binary counter 710 which has its output coupled to both multiplexer 25 and demultiplexer 45 on lines 711 through 714 for providing the synchronous four-bit binary count required. Also provided to the multiplexer 25 and the demultiplexer 45 is an enable signal from the system clock on line 701 and a timing signal to the CPU 65 on line 702. The clock 70 also provides an enable signal on line 703 to the analog multiplexer 55, an analog-to-digital converter 60, a tri-state latch 655 and a tri-state buffer 660. The scanning interval of analog multiplexer 55 is determined by a four-bit binary signal that is provided from the CPU 65 over data bus 670 to the tri-state latch 655 where it is stored and then applied to the count input of multiplexer 55 over lines 656 through 659.

The eight-bit analog-to-digital converter 60 receives the sixteen different output signals from the peak detectors and couples these signals onto the data bus 670 and to the CPU 65 via the buffer 660. The CPU 65 uses this signal to select the appropriate microphone channel to be in the selected state and the appropriate microphone channels to be in the mixed state, as well as the microphone channels that are left in the off state.

By providing the reference level along with the signals for processing by the CPU 65, the requirement for having a stable reference is avoided. This is possible since any drifts in the reference level will be compensated for in the CPU 65. For example, the reference level can drift because of diodes in the circuit paths having coefficients that vary with temperature. The ground reference level that accompanies the microphone signals, however, compensates for any unaccounted for offsets of the signals going through the system by including the offsets in determining a reference for absolute zero. This new reference level is then subtracted in the CPU 65 from all of the readings and a true measure of the talking levels is obtained.

In providing an eight-bit signal to the CPU 65, the analog-to-digital converter 60 provides 256 discrete signal levels. These signal levels are used as follows by the CPU 65. The lower threshold level below which signals are ignored is defined to be a signal level of 3 above the digitized value of the reference level, the reference level being the level of any or all of the sampled ground inputs and is considered to be at absolute zero by the CPU 65. And the upper threshold is defined dynamically as a level 50% above the microphone channel presently in the selected state. In order for a microphone to reach the mixed state, the microphone channel must exceed a signal level of 16 above the reference level at least once after the room is placed in a conference mode.

The algorithm for making this selection can be set forth generally as follows:

1. An upper threshold is defined above the level of the present selected microphone channel.
2. The loudest talker is determined.
3. If the loudest talker's level is less than a lower threshold (set slightly above ambient noise), then disregard it.
4. If the loudest talker's level is greater than the upper threshold, then consider this the new selected microphone channel and couple this channel to an audio line unattenuated.
5. All other activated microphone channels are coupled to the audio line attenuated.

Computer printout Appendix A contains, in coded form, one possible sequence of elementary operations for achieving, via the CPU indicated, the voice-actuated switching system shown in the Figures and described in the foregoing description. The program is written in PL/M program language and is fully described in many references. One such reference is by Daniel D. McCracken, entitled *A Guide to PL/M Programming for Microcomputer Applications*, Addison-Wesley Publishing Company, Inc., 1978.

Various modifications within the scope of this invention are possible. By way of example, a voice-actuated switching system is implemented in a video teleconferencing arrangement using voice-switched cameras. Like audio teleconferencing, video teleconferencing, since it also saves travel time and cost, is expected to become an important communications method.

In video teleconferencing, a plurality of video cameras are generally used and the field of view of each is restricted to a small number of persons in the group. Voice voting and switching are used to determine the location of the person in the group who is talking and to enable the appropriate camera to respond thereto so that the talker will be seen at the remote location. As different people in the group speak, the appropriate cameras covering the same are successfully enabled so that the outgoing video signal matches the audio signal.

Figure 4:
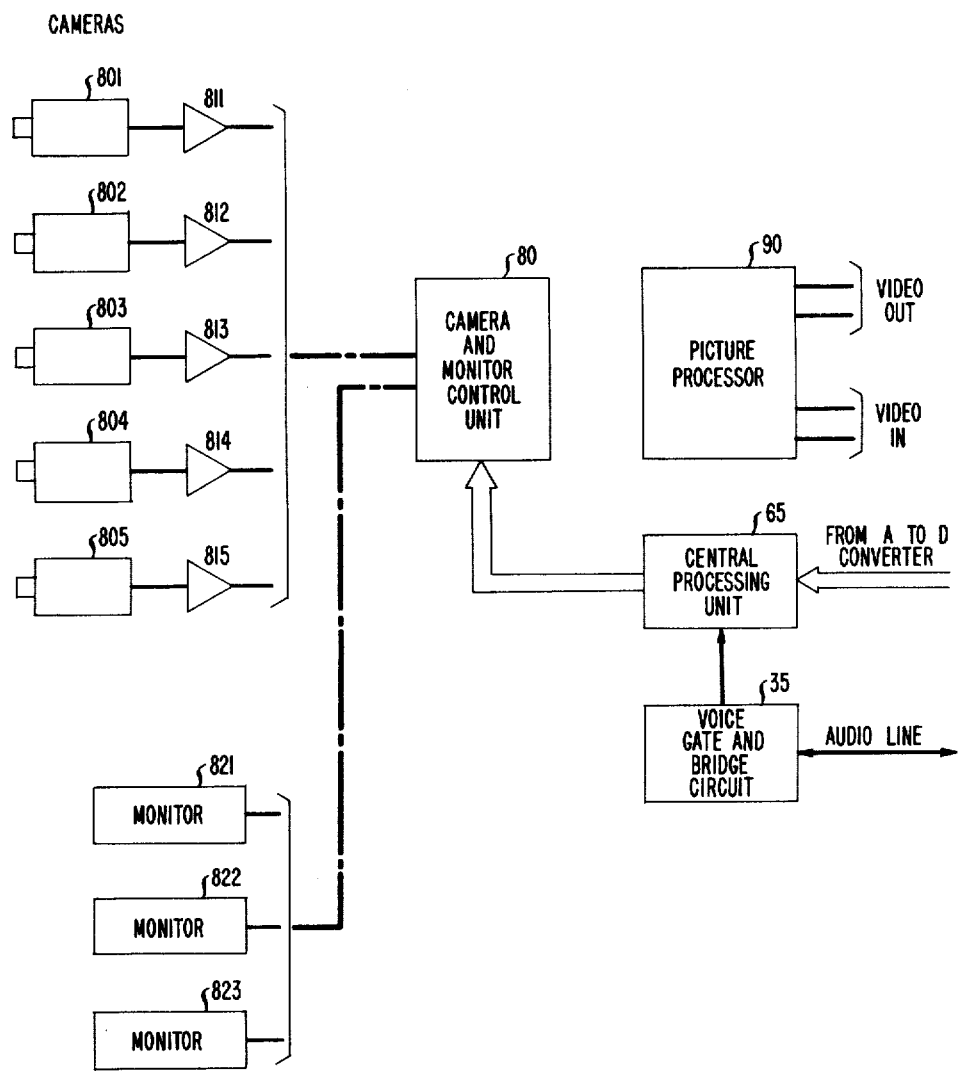
FIG. 4 shows a modified embodiment of the voice-actuated switching system of FIG. 1 in accordance with the present invention.

Shown in FIG. 4, in accordance with the invention, is a modified embodiment of the switching system of FIG. 1 wherein video cameras are selected according to voice voting. The cameras 801 through 805 are connected to a camera and monitor control unit 80 via respective amplifiers 811 through 815. Also connected to the camera and monitor control unit 80 are monitors 821 through 823 that are set to show either the incoming or outgoing signals as preferred.

With the microphone signal levels and the signal ground reference level provided by the analog-to-digital converter 60, the CPU 65 compares and determines which signal is of the greatest magnitude. The CPU 65 then applies a control signal to the camera and monitor control unit 80 for selecting the camera that includes the speaking conferee in its field of view. Input from the voice gate and bridge circuit 35 is provided to the CPU 65 for determining whether the conference room is in a transmit or receive audio state. Hence, when the room is in a transmit audio state, the camera and monitor control unit 80 is instructed by the CPU 65 to send a video signal to the picture processor 90 for transmission to the remote conference locations. When in the receive audio state, locally generated video signals are shown as desired along with the received video signal from a remote conference location on the monitors 821 through 823. The picture processor 90 arranges the video signal in an analog or digital format necessary for transmission to the one or more remote conference locations. Computer printout Appendix B contains a sequence of operations for implementing the voice-actuated switching system for video teleconferencing as shown in FIG. 4 and described in the foregoing description.

Various other modifications of this invention are contemplated and may obviously be resorted to by those skilled in the art without departing from the spirit and scope of the invention as hereinafter defined by the appended claims.

```
ISIS-II PL/M-80 V3.1 COMPILATION OF MODULE VOTERMOD
OBJECT MODULE PLACED IN :F5:VOTER.OBJ
COMPILER INVOKED BY:  PLM80 :F5:VOTER.PLM DEBUG WORKFILES(:FU:,:FO:) PAGEWIDTH(100)
                      PAGELENGTH(45) N-OXREF

/* NAME - (MICROPHONE) VOTER                               */
                   $ EJECT
     1             VOTER$MOD:    DO;

/* INPUT/OUTPUT ARRAY REFERENCES */
                   $ NOLIST INCLUDE (:FO:PORTS.PLM)
                   $ LIST
                   /* KEYWORD MACROS */
                   $ NOLIST INCLUDE (:FO:KEYMAC.PLM)
                   /* GENERAL PURPOSE LITERALS */
                   $ NOLIST INCLUDE (:FO:GENLIT.PLM)
                   /* PMS SYSTEM LITERALS */
                   $ NOLIST INCLUDE (:FO:SYSLIT.PLM)
                   /* PERFORMANCE MONITOR LITERALS */
                   $ NOLIST INCLUDE (:FO:PMSPM.LIT)
                   $ EJECT
                   $ INCLUDE (:FO:PMSAM.LIT)
              = /*:
              =      AUDIO MONITOR TRIGGER SWITCH
              = PURPOSE:
              =      TO ENABLE VARIOUS EVENT TRIGGERS
              =      FOR THIS AUDIO MONITORING FUNCTION
              =
              =    EVENT                         BIT
              =    -----                         ---
              =    1. MICROPHONES SWITCHED BY VOTER    D0
              =      (OR MICROPHONE MASK CHANGE)
              =    2. SPEAKERPHONE STATUS TRANSITION   D1
              =    3. AUDIO ADD-ON STATUS TRANSITION   D2
              =    4. PERIODIC TRIGGERING                    D3
              = :*/
              =
   342    1   =    DEC VOX      LIT '00000001B';   /* VOICE SWITCH */
   343    1   =    DEC SPX      LIT '00000010B';   /* SPEAKERPHONE TRANSITION */
   344    1   =    DEC AAX      LIT '00000100B';   /* AUDIO ADD-ON TRANSITION */
   345    1   =    DEC PER      LIT '00001000B';   /* PERIODICALLY TRIGGERED */
              =    /* DEC ---   LIT '00010000B';   /* --- */
              =    /* DEC ---   LIT '00100000B';   /* --- */
              =    /* DEC ---   LIT '01000000B';   /* --- */
              =    /* DEC ---   LIT '10000000B';   /* --- */
              =
                   $ EJECT
                   /* EXTERNAL DATA */

346    1        DEC CLEVEL(16) BYTE EXT;  /* CURRENT MIKE LEVEL ARRAY */
   347    1        DEC MIKE$REF BYTE EXT;    /* REFERENCE LEVEL */
   348    1        DEC MSWAY (3) BYTE EXT;   /* MICROPHONE SWITCH ARRAY */
```

```
349   1        DEC HIGH$MIC BYTE EXT; /* HIGH MIKE INDEX */
350   1        DEC (MICMASK0,MICMASK1,MICMASK2) BYTE EXT;
351   1        DEC MM (3) BYTE EXT;
352   1        DEC MSKCHANGE BYTE EXT; /* MASK CHANGED FLAG */

/* LOCAL DATA */

353   1        DEC MAXI BYTE; /* INDEX OF MAX MIKE */
354   1        DEC MAXL BYTE; /* LEVEL OF MAX MIKE */

355   1        DEC RL$CTR BYTE; /* REFERENCE LEVEL UPDATE COUNTER */
356   1        DEC (I,L) BYTE; /* POLLING INDEX, LEVEL */

357   1        DEC MVPB$STR /* MICROPHONE VOTER PARAMTER BLOCK STRUCTURE */
               LIT 'STR (
               QT BYTE, /* QUIET THRESHOLD */
               VT BYTE) /* VOTER THRESHOLD */';

358   1        DEC MVPBT MVPB$STR /* TEMPLATE */
               DATA (16,3);

359   1        DEC MVPB MVPB$STR PUB; /* MICROPHONE VOTER PARAMETER BLOCK */
360   1        DEC (OLDMASK0,OLDMASK1,OLDMASK2) BYTE; /* FOR DETECTING TRANSITIONS */

/* EXTERNAL PROCEDURES */

361   1      TM20US:   PROC EXT;
362   2      END TM20US;

363   1      AM$DUMP: PROC (S) EXT;
364   2        DEC S BYTE;
365   2      END AM$DUMP;

366   1      PMO: PROC (C) EXT;
367   2        DEC C BYTE;
368   2      END PMO;
             $ EJECT
             /*
                MICROPHONE CONTROL INITIALIZATION
             PURPOSE:
                1. FORCE REFERENCE LEVEL HIGH TO INHIBIT WRITING
                   LEVEL ARRAY WHEN POLLING
                2. CLEAR MICROPHONE LEVEL ARRAY
                3. CLEAR REFERENCE LEVEL COUNTER TO ASSURE 256 POLLING
                   CYCLES BEFORE INSTALLING A PRESUMABLY VALID REFERENCE
                   LEVEL FROM THE DUMMY CHANNEL READING
                4. CLEAR MICROPHONE MASKS, SWITCHES
                5. INITIALIZE PARAMETER BLOCK
             */
369   1      MC$INIT: PROC PUB;
370   2        DEC LI BYTE;

371   2      MIKE$REF = 0FFH; /* EXCESSIVE REFERENCE LEVEL INTENTIONAL */
372   2      RL$CTR = 0; /* CLEAR UPDATE COUNTER */

373   2      DO LI = 0 TO 15; /* SCAN LEVELS */
374   3         CLEVEL(LI) = 0; /* CLEAR ARRAY */
375   3      END;

376   2      MICMASK0,MICMASK1,MICMASK2, /* CLEAR MASKS, SWITCHES */
             OLDMASK0,OLDMASK1,OLDMASK2,
             MSWAY(0),MSWAY(1),MSWAY(2),
             MIC$SW$1$4,MIC$SW$5$8,MIC$SW$9$12 = 0;

/* INVOKE PERFORMANCE MONITOR */
377   2      CALL PMO(PMO$MUM); /* MICROPHONE MASKS OP */
378   2      CALL PMO(NULL); CALL PMO(NULL); CALL PMO(NULL); /* MASKS CLEARED */

381   2      CALL MOVE(SIZE(MVPBT),.MVPBT,.MVPB); /* INSTALL P-BLOCK */

382   2      END MC$INIT;

/*----------------------------------------------------------*/
```

```
$ EJECT
/*
    MICROPHONE ENABLE MASK MAINTENANCE
PURPOSE:
    MICROPHONE ENABLE MASKS (MICMASK0,MICMASK1,MICMASK2)
    ARE INITIALIZED TO ZERO, I.E. ALL DISABLED
    (SEE INIT MODULE)

EACH MASK BEARS A ONE-TO-ONE CORRESPONDENCE, BIT-WISE
    AND BYTE-WISE, WITH THE MICROPHONE SWITCH PORTS.

IN THIS MODULE,
    ANY MICROPHONE LEVEL EXCEEDING A THRESHOLD
    (DEFINED AS MVPB.QT ABOVE THE REFERENCE LEVEL MEASURED
    FROM THE DUMMY MICROPHONE, WHICH HAS A GROUNDED INPUT)
    IS CONSIDERED TO BE EXISTENT, AND BECOMES MASKED IN,
    FOR ALL TIME.

EACH SUCH ENABLED MICROPHONE IS SWITCHED WHEN MICROPHONE
    VOTER LOGIC PERFORMS A MICROPHONE SWITCH,
    BEING EITHER "MIXED," I.E. ATTENUATED, OR CUT THROUGH
    UNATTENUATED (IF IT IS THE SELECTED PEAK MICROPHONE).
*/
```

| | | |
|---|---|---|
| 383 | 1 | `MICMASK: PROC PUB;` |
| 384 | 2 | `DEC PATT(4) BYTE DATA (11H,22H,44H,88H);` |
| 385 | 2 | `DEC (I,PATTERN) BYTE;` |
| 386 | 2 | `DO I = 0 TO 3;` |
| 387 | 3 | `    PATTERN = PATT(I);` |
| 388 | 3 | `    IF (CLEVEL(I) > MVPB.QT)` |
|     |   | `    THEN MICMASK0 = MICMASK0 OR PATTERN;` |
| 390 | 3 | `    IF (CLEVEL(I + 4) > MVPB.QT)` |
|     |   | `    THEN MICMASK1 = MICMASK1 OR PATTERN;` |
| 392 | 3 | `    IF (CLEVEL(I + 8) > MVPB.QT)` |
|     |   | `    THEN MICMASK2 = MICMASK2 OR PATTERN;` |
| 394 | 3 | `END;` |
| 395 | 2 | `IF MICMASK0 <>OLDMASK0` |
|     |   | `THEN DO:` |
| 397 | 3 | `    OLDMASK0 = MICMASK0;` |
| 398 | 3 | `    MSKCHANGE = OFFH;` |
| 399 | 3 | `END;` |
| 400 | 2 | `IF MICMASK1 <> OLDMASK1` |
|     |   | `THEN DO;` |
| 402 | 3 | `    OLDMASK1 = MICMASK1;` |
| 403 | 3 | `    MSKCHANGE = OFFH;` |
| 404 | 3 | `END;` |
| 405 | 2 | `IF MICMASK2 <> OLDMASK2` |
|     |   | `THEN DO;` |
| 407 | 3 | `    OLDMASK2 = MICMASK2;` |
| 408 | 3 | `    MSKCHANGE = OFFH;` |
| 409 | 3 | `END;` |
| 410 | 2 | `IF MSKCHANGE = OFFH` |
|     |   | `THEN DO; /* INVOKE PERFORMANCE MONITOR */` |
| 412 | 3 | `    CALL PMO(PMO$MUM);` |
| 413 | 3 | `    CALL PMO(MM(0));` |
| 414 | 3 | `    CALL PMO(MM(1));` |
| 415 | 3 | `    CALL PMO(MM(2));` |
| 416 | 3 | `END;` |
| 417 | 2 | `END MICMASK;` |

```
/*---------------------------------------------------------------*/
$ EJECT
/*
    MICROPHONE CONTROL
PURPOSE:
    IMPLEMENTATION OF ALGORITHM FOR VOICE ACTIVATED
    MICROPHONE SWITCHING, ESSENTIALLY BASED ON AUDIO
    CONTENTION (WHO'S THE LOUDEST?).
*/
```

| | | |
|---|---|---|
| 418 | 1 | `MIKECONTROL: PROC PUB;` |

```
419    2     DEC (MIC$GRP,BIT$POS) BYTE;
420    2     DEC NPTR ADDRESS;
421    2     DEC NEWVAL BASED NPTR BYTE;
422    2     DEC RL BYTE; /* REFERENCE LEVEL TEMP */

/* BIT POSITION MASKS FOR AUDIO PREAMP SWITCH
                SELECTION & MIXING OF MICROPHONES
                WITHIN A GROUP OF FOUR */
423    2     DEC BP$MASK (4) BYTE
             /* MSN ==> SELECTION, LSN ==> ATTENUATION */
             DATA (1EH,   /* SELECT 0, ATTENUATE 1,2,3 */
                   2DH,   /* SELECT 1, ATTENUATE 0,2,3 */
                   4BH,   /* SELECT 2, ATTENUATE 0,1,3 */
                   87H);  /* SELECT 3, ATTENUATE 0,1,2 */
             $ EJECT
             /*
                MICROPHONE SWITCHING DECISION
             */
424    2     SWITCH: PROC BYTE;

/* FAST DECAY */
425    3     IF (MAXI <> HIGH$MIC) /* NEW HIGH MICROPHONE */
             AND /* 3 DB CRITERION SATISFIED */
             (MAXL > (CLEVEL(HIGH$MIC) + SHR(CLEVEL(HIGH$MIC),1)))
             AND (MAXL > MVPB.VT) /* EXCEEDS VOTER THRESHOLD */
             THEN RETURN TRUE; /* SWITCH */
427    3     ELSE RETURN FALSE;

428    3     END SWITCH;
             $ EJECT
             /* POLL ALL MICROPHONE INPUTS */

429    2         NPTR = .CLEVEL(0); /* ADDRESS LEVEL ARRAY */

430    2         MAXL = 0; /* INIT MAXIMUM LEVEL */
431    2         MAXI = 15; /* USE LAST AS INDEX OF MAXIMUM */

432    2         DO I = 0 TO 15; /* POLLING LOOP */

433    3             MUX$ENBL$SEL = DET$MUX$1 OR I; /* SELECT */
434    3             START$CONVERT = 0; /* START D/A CONVERSION */
435    3             CALL TM20US; /* DELAY */
436    3             L = READ$A$D; /* READ A/D */
437    3             MUX$ENBL$SEL = 0; /* DESELECT */

438    3             IF I = DUMMY$MIKE
                     THEN NEWVAL = L; /* UNADJUSTED */

440    3             ELSE DO; /* REAL MICROPHONES */

441    4                 IF L > MIKE$REF /* REQUIRED */
                         THEN NEWVAL = L - MIKE$REF; /* ADJUSTED LEVEL */
                         /* ELSE RETAIN OLD VALUE */

443    4                 IF NEWVAL > MAXL /* NEW MAX LEVEL */
                         THEN DO; /* RECORD INDEX, LEVEL OF MIKE */
445    5                     MAXI = I;
446    5                     MAXL = NEWVAL;
447    5                 END;

448    4             END;

449    3             NPTR = NPTR + 1; /* ADDRESS NEXT LEVEL IN ARRAY */
450    3         END;

451    2         IF (RL$CTR := RL$CTR + 1) = 0 /* EVERY 2.56 SECONDS */
                 THEN /* UPDATE REFERENCE SUBJECT TO RANGE CRITERION */
452    2         IF ( (RL:=CLEVEL(DUMMY$MIKE)) > 08H)
                 AND (RL < 20H)
                 THEN MIKE$REF = RL; /* UPDATE REFERENCE LEVEL */
             $ EJECT
454    2         IF (MSKCHANGE = 0) /* NO NEW MIKES ENABLED */
                 AND (HIGH$MIC = MAXI) /* SAME OLE' MICROPHONE */
                 THEN RETURN;

456    2         IF SWITCH /* TO A NEW MICROPHONE */
                 OR (MSKCHANGE <> 0) /* ANOTHER MASKED IN */
                 THEN DO;
```

```
458  3        /* ASSIGN NEW HIGH MICROPHONE & INVOKE PERFORMANCE MONITOR */
              CALL PMO(PMO$MSW OR (HIGH$MIC:=MAXI));

459  3        CALL MIC$MASK; /* UPDATE MASKS IF NECESSARY */
460  3        MSKCHANGE = 0; /* CLEAR MASK CHANGE FLAG */

461  3        MICGRP = SHR(HIGH$MIC,2); /* GET MICROPHONE GROUP */

462  3        BIT$POS = BP$MASK(HIGH$MIC AND 3); /* SELECT SWITCH MASK */

463  3        IF MIC$GRP = 0 /* GROUP 0, MICROPHONES 1-4 */
              THEN MIC$SW$1$4,MSWAY(0) = BIT$POS AND MICMASK0;
465  3        ELSE MIC$SW$1$4,MSWAY(0) = 0FH AND MICMASK0;

466  3        IF MIC$GRP = 1 /* GROUP 1, MICROPHONES 5-8 */
              THEN MIC$SW$5$8,MSWAY(1) = BIT$POS AND MICMASK1;
468  3        ELSE MIC$SW$5$8,MSWAY(1) = 0FH AND MICMASK1;

469  3        IF MIC$GRP = 2 /* GROUP 2, MICROPHONES 9-12 */
              THEN MIC$SW$9$12,MSWAY(2) = BIT$POS AND MICMASK2;
471  3        ELSE MIC$SW$9$12,MSWAY(2) = 0FH AND MICMASK2;

472  3        CALL AM$DUMP(VOX); /* TRIGGER POINT FOR AUDIO MONITOR */

473  3        END;

474  2    END MIKECONTROL;
          /*---------------------------------------------------*/

475  1    END VOTERS$MOD;

MODULE INFORMATION:

CODE AREA SIZE      = 0307H    775D
              VARIABLE AREA SIZE  = 0012H     18D
              MAXIMUM STACK SIZE  = 0006H      6D
              1338 LINES READ
              0 PROGRAM ERROR(S)

END OF PL/M-80 COMPILATION

ISIS-II PL/M-80 V3.1 COMPILATION OF MODULE CAMCONMOD
          OBJECT MODULE PLACED IN :F5:CAMCON.OBJ
          COMPILER INVOKED BY:  PLM80 :F5:CAMCON.PLM DEBUG WORKFILES(:F0:,:F0:) PAGEWIDTH(100)
                                PAGELENGTH(45-NOXREF

1    CAMCONMOD:
          DO;

/* INPUT/OUTPUT ARRAY REFERENCES */
          $ NOLIST INCLUDE (:F0:PORTS.PLM)
          $ LIST
          /* KEYWORD MACROS */
          $ NOLIST INCLUDE (:F0:KEYMAC.PLM)
          /* GENERAL PURPOSE LITERALS */
          $ NOLIST INCLUDE (:F0:GENLIT.PLM)
          /* PMS SYSTEM LITERALS */
          $ NOLIST INCLUDE (:F0:SYSLIT.PLM)

$ EJECT
          /* CAMERA LITERALS */
312  1    DEC NO$CAM LIT '0FFH'; /* NO CAMERA ASSIGNMENT */
313  1    DEC FF0$CAM LIT '0'; /* FACE TO FACE CAMERA 0 */
314  1    DEC FF1$CAM LIT '1'; /* FACE TO FACE CAMERA 1 */
315  1    DEC FF2$CAM LIT '2'; /* FACE TO FACE CAMERA 2 */
316  1    DEC FF3$CAM LIT '3'; /* FACE TO FACE CAMERA 3 */
317  1    DEC FF4$CAM LIT '4'; /* FACE TO FACE CAMERA 4 */
318  1    DEC O$CAM LIT '5'; /* OVERVIEW CAMERA */

/* FACE-TO-FACE CAMERA MODES */
319  1    DEC A$MODE LIT '1'; /* AUTOMATIC */
320  1    DEC C$MODE LIT '2'; /* CLOSEUP */
321  1    DEC O$MODE LIT '3'; /* OVERVIEW */

322  1    DEC MCX LIT 'MIC$CAM$XREF'; /* FOR BREVITY */

/* EXTERNAL PROCEDURES */
```

```
323  1    VIDEO: PROC (I,O) EXT;
324  2    DEC (I,O) BYTE;
325  2    END VIDEO;

/* EXTERNAL VARIABLES */

326  1    DEC MIC$CAMSXREF(12) BYTE EXT;
327  1    DEC C$LEVEL(16) BYTE EXT;
328  1    DEC HIGH$MIC BYTE EXT;
329  1    DEC CURRENT$CAM BYTE EXT;
330  1    DEC CURRENT$CAM$MIC BYTE EXT;
331  1    DEC NEXT$CAM$MIC BYTE EXT;
332  1    DEC CAMERA$MODE BYTE EXT;
333  1    DEC CAM$TIMER BYTE EXT;
334  1    DEC OV$TIMER BYTE EXT;
335  1    DEC CON$LAMP(4) BYTE EXT;

$ EJECT
          /*
              CONDITIONAL CAMERA SWITCH
          PURPOSE:
              PROVIDE SWITCH TO CAMERA ASSOCIATED WITH
              THE PENDING MICROPHONE (NEXT$CAM$MIC)
              EXCEPT
                IF CLOSEUP MODE & MAPPED CAMERA NOT A CLOSEUP CAMERA
          */
336  1    CC$SWITCH: PROC;
337  2    DEC C BYTE; /* CAMERA */

338  2    IF (C := MIC$CAMSXREF(NEXT$CAM$MIC)) = NO$CAM
          THEN RETURN; /* GET ASSOCIATED CAMERA */

340  2    IF (CAMERA$MODE = C$MODE) /* CLOSEUP MODE */
            AND (C = O$CAM) /* YET CLOSEUP CAMERA NOT MAPPED */
            THEN RETURN; /* MEANS NO ACTION */

342  2    ELSE DO;
343  3        CURRENT$CAM = C; /* SWITCH CAMERA */
344  3        CURRENT$CAM$MIC = NEXT$CAM$MIC;
345  3        NEXT$CAM$MIC = DUMMY$MIKE; /* DUMMY MIC */

/* FACE-TO-FACE SEND ? */
346  3        IF (CON$LAMP(3) AND LMP$SENDFLD) < LMP$MPS
              THEN CALL VIDEO(CURRENT$CAM,V$WO$TRANSMIT);
348  3    END;

349  2    END CC$SWITCH;

$ EJECT
350  1    CAMERACONTROL: /* (LYNCH'S ALGORITHM) */

PROC PUB;

351  2    DEC OFFSET LIT '3'; /* THRESHOLD ABOVE REFERENCE LEVEL */

352  2    IF CAMERA$MODE = O$MODE THEN
353  2      /* NO SWITCHING IN OVERVIEW MODE */ RETURN;

/*
              TIMEOUT TO OVERVIEW VIDEO WHEN IN AUTO MODE
          */
354  2    IF (SPKRPHN$STAT AND LOT) /* LOT = 1 ==> RECEIVE */

/* OR ((ADD$ON$IN AND RL06) = 0)
          /* AA SPKRPHONE STATUS CONSIDERED DOMINATED BY ROOM SPKRPHONE */
          /* LOUDEST MICROPHONE LEVEL IS NOT EVEN CONSIDERED */

THEN DO;
356  3        IF CAMERA$MODE = A$MODE THEN    /* AUTO MODE, QUIET */

357  3        IF OV$TIMER = 0 /* NO TIMEOUT GOING */
                THEN OV$TIMER = 100;    /* START ONE */
359  3        ELSE DO; /* TIMEOUT GOING */
360  4            IF (OV$TIMER := OV$TIMER - 1) = 0
                  THEN DO;
362  5                CURRENT$CAM = O$CAM; /* INDICATE OVERVIEW */
363  5                CURRENT$CAM$MIC = DUMMY$MIKE; /* DUMMY */
```

```
                        /* FACE-TO-FACE SEND? */
                        IF (CONSLAMP(3) AND LMP$SENDFLD) < LMP$MPS
364   5
                        THEN /* SELECT OVERVIEW */
365   5                 CALL VIDEO(VSWISFFO,VSWOSTRANSMIT);
366   5              END;
367   4           END;

368   3           CAMSTIMER = 0;  /* DISABLE CLOSEUP TIMEOUT */
369   3           NEXTSCAMSMIC = DUMMYSMIKE;
370   3           RETURN;  /* RETURN IF QUIET */
371   3        END;

$ EJECT
           /*
               AUTO OR CLOSEUP MODE, NOT QUIET
           */
372   2    OVSTIMER = 0;   /* DISABLE QUIET COUNT */
373   2    IF HIGHSMIC = CURRENTSCAMSMIC
           THEN DO; /* HIGH MIC ON CURRENT CAM */
375   3        CAMSTIMER = 0;  /* DISABLE TIMEOUT */
376   3        NEXTSCAMSMIC = DUMMYSMIKE; /* DUMMY MIC */
377   3        RETURN;
378   3    END;

/*
               HIGH MIC IS NOT ON CURRENT CAMERA
           */
379   2    IF (CAMSTIMER <> 0) /* TIMEOUT IN PROGRESS */
           AND (NEXTSCAMSMIC = HIGHSMIC) /* SAME SELECTED MICROPHONE */
           AND CSLEVEL(HIGHSMIC) > OFFSET /* NOMINAL LEVEL */
           THEN DO;
381   3        IF (CAMSTIMER := CAMSTIMER - 1) = 0 /* TIMED OUT */
               THEN CALL CCSSWITCH; /* CONDITIONAL CAMERA SWITCH */
383   3        RETURN; /* REGARDLESS */
384   3    END;

/*
               NO TIMEOUT IN PROGRESS OR LEVEL INSUFFICIENT
               OR PENDING NOT THE HIGHEST
           */
385   2    IF CSLEVEL(HIGHSMIC) > OFFSET /* HIGH MIC LOUD ENOUGH */
           THEN IF MICSCAMSXREF(HIGHSMIC) <> NOSCAM /* CAMERA PRESENT? */
           THEN DO;
388   3        CAMSTIMER = 5;  /* START 0.5 SECOND TIMEOUT */
389   3        NEXTSCAMSMIC = HIGHSMIC; /* PENDING <-- HIGH MICROPHONE */
390   3    END;
391   2    ELSE DO;
392   3        CAMSTIMER = 0;  /* DISABLE TIMEOUT */
393   3        NEXTSCAMSMIC = DUMMYSMIKE; /* DUMMY MIC */
394   3    END;

395   2    END CAMERACONTROL;

396   1    END CAMCONMOD;

MODULE INFORMATION:

CODE AREA SIZE      = 0136H      310D
               VARIABLE AREA SIZE  = 0001H        1D
               MAXIMUM STACK SIZE  = 0004H        4D
               983 LINES READ
               0 PROGRAM ERROR(S)

END OF PL/M-80 COMPILATION
```

What is claimed is:

1. A voice-actuated switching system for selectively connecting speech signals from a plurality of speech circuits to an output line, the system comprising:

a plurality of circuits for generating speech signals;

comparison means automatically operative in response to the signals from the speech circuits for selecting that one of the signals having the greatest magnitude;

means for connecting the selected one of the signals to the output line at an unattenuated level and for connecting unselected signals to the output line at an attenuated level; and the comparison means determining the signal with the greatest magnitude by comparing the signals both with reference to each other and with reference to a ground potential, the comparing of the signals with the ground potential providing a means for nulling any extraneous signals being induced in the speech signals in determining the selected one of the speech signals.

2. The system in accordance with claim 1 wherein the comparison means includes an analog multiplexer and an analog demultiplexer for sequentially sampling each of the plurality of speech circuits and the ground reference level and providing output signals representative thereof within a first time period.

3. The system in accordance with claim 2 wherein the multiplexer and demultiplexer have an amplifier connected therebetween, the amplifier having its input sequentially connected to each of a plurality of inputs of the multiplexer for amplifying the respective signals of the speech circuits thereupon and measuring the ground reference level at the input of the multiplexer, and its output alternately connected between each of a plurality of outputs of the demultiplexer, the outputs of the demultiplexer corresponding in number to the inputs of the multiplexer.

4. The system in accordance with claim 3 wherein the comparison means further comprises a plurality of peak detectors, each peak detector being associated with one of the speech circuits or the ground reference level and connected to one of the plurality of outputs of the demultiplexer.

5. The system in accordance with claim 4 wherein the comparison means further comprises a second analog multiplexer with a plurality of inputs, each input being connected to one of the plurality of peak detectors for sequentially sampling within a second time period the voltage level representing each of the speech circuit signals stored thereupon or the ground reference level, the second time period being greater than the first time period.

6. The system in accordance with claim 5 wherein the first and second analog multiplexers and the analog demultiplexer in combination provide for the first sampling time period for measuring the signal from the speech circuits and ground reference level, and the second protracted sampling time period for measuring the voltage stored on the peak detectors.

7. The system in accordance with claim 5 wherein the comparison means further comprises an analog-to-digital converter for converting each of the speech circuit signals and the ground reference signal to its respective digital equivalent signal, the analog-to-digital converter having as its input the output of the second analog multiplexer.

8. The system in accordance with claim 7 wherein the comparison means further includes a central processing unit connected to the output of the digital-to-analog converter, the central processing unit comparing each of the digital speech circuit signals with each other and with the digital ground reference level, and selecting that one of the signals having the greatest magnitude above the ground reference level.

9. The system in accordance with claim 8 wherein the means for connecting the selected and unselected signals to the output line comprises a control unit, and the central processing unit further includes means for applying a first control signal identifying the speech circuit signal having the greatest magnitude to the control unit.

10. The system in accordance with claim 9 wherein the comparison means further includes memory means for identifying the speech circuits having those unselected signals that have exceeded a predetermined magnitude with respect to the ground reference level, the comparison means providing a second control signal reflecting this occurrence to the control unit.

11. The system in accordance with claim 10 wherein the control unit connects the unselected signals to the output line at an attenuated level, the attenuated level having more loss inserted than the unattenuated signal level and is applied in response to the second control signal, and the speech circuits having other of the speech signals being disconnected from the output line by the control unit in the absence of a first or a second control signal.

12. The system in accordance with claim 11 wherein the comparison means provides for the selected signal having the greatest magnitude in a first selection interval to be replaced with another selected signal having the greatest magnitude in a subsequent selection interval, a selection interval being equal to the second time period.

13. A voice-actuated switching system for selectively connecting speech signals from a plurality of speech circuits to an output line, the system comprising:

a plurality of circuits for generating speech signals;

comparison means automatically operative in response to the signals from the speech circuits for selecting that one of the signals having the greatest magnitude, the signals from the speech circuits existing in one of three possible states, selected, unselected or off;

means for connecting the selected one of the signals to the output line at an unattenuated level and for connecting unselected signals to the output line at an attenuated level, the unselected signals having at least once exceeded a predetermined magnitude; and means for changing the state of each one of the off speech signals to either the selected speech signal or one of the unselected speech signals, the changing means being operative upon receiving a speech signal above the predetermined magnitude at least once from the associated speech circuit, the off speech signals otherwise being disconnected from the output line.

14. The system in accordance with claim 13 wherein the comparison means determines the signal with the greatest magnitude by comparing the signals both with reference to each other and with reference to a ground potential.

15. The system in accordance with claim 13 wherein the comparison means includes an analog multiplexer and an analog demultiplexer for sequentially sampling each of the plurality of speech circuits and the ground reference level and providing output signals representative thereof within a first time period.

16. A voice-actuated switching system for selectively connecting speech signals from a plurality of speech circuits to an output line, the system comprising:
   a plurality of circuits for generating speech signals;
   comparison means automatically operative in response to the signals from the speech circuit for selecting that one of the signals having the greatest magnitude;
   means for connecting the selected one of the signals to the output line at an unattenuated level and for connecting unselected signals to the output line at an attenuated level;
   the comparison means further including an analog multiplexer and an analog demultiplexer for sequentially sampling each of the plurality of speech circuits and providing output signals representative thereof within a first time period.

17. The system in accordance with claim 15 and 16 wherein the multiplexer and the demultiplexer have an amplifier connected therebetween, the amplifier having its input sequentially connected to each of a plurality of inputs of the multiplexer for amplifying the respective signals of the speech circuits thereupon, and its output alternately connected between each of a plurality of outputs of the demultiplexer, the outputs of the demultiplexer corresponding in number to the inputs of the multiplexer.

18. The system in accordance with claim 17 wherein the comparison means further comprises a plurality of peak detectors, each peak detector being associated with one of the speech circuits and connected to one of the plurality of outputs of the demultiplexer.

19. The system in accordance with claim 18 wherein the comparison means further comprises a second analog multiplexer with a plurality of inputs, each input being connected to one of the plurality of peak detectors for sequentially sampling within a second time period the voltage level representing each of the speech circuit signals stored thereupon, the second time period being greater than the first time period.

20. The system in accordance with claim 19 wherein the comparison means further comprise an analog-to-digital converter for converting each of the speech circuit signals to its representative digital equivalent signal, the analog-to-digital converter having as its input the output of the second multiplexer.

21. The system in accordance with claim 20 wherein the comparison means further includes a digital comparator connected to the output of the analog-to-digital converter, the digital comparator comparing each of the digital equivalent signals with each other and selecting that one of the signals having the greatest magnitude.

22. The system in accordance with claim 21 wherein the means for connecting the selected and unselected signals to the output line comprises a control unit, and the comparison means further includes means for applying a first control signal identifying the speech circuit signal having the greatest magnitude to the control unit.

23. The system in accordance with claim 22 wherein the comparison means further includes memory means for identifying the speech circuits having those signals that have exceeded a predetermined magnitude with respect to a ground reference level, the comparison means providing a second control signal reflecting this occurrence to the control unit.

24. The system in accordance with claim 23 wherein the control unit couples the unselected signals to the output line at an attenuated level, the attenuated level having more loss inserted than the unattenuated signal level and is applied in response to the second control signal, and speech circuits having other of the speech signals being disconnected from the output line by the control unit in the absence of a first or a second control signal.

25. A voice-actuated switching system for selectively connecting speech signals from a plurality of speech circuits to an output line, the system comprising:
   a plurality of circuits for generating speech signals;
   comparison means automatically operative in response to the signals from the speech circuits for selecting that one of the signals having the greatest magnitude;
   means for connecting the selected one of the signals to the output line at an unattenuated level and for connecting the unselected signals to the output line at an attenuated level; and
   the comparison means further including signal detecting means for detecting the peak amplitude of each speech circuit signal and means for sequentially sampling both the plurality of speech circuits and signal detecting means, the sampling means in combination providing for a first sampling time period for measuring the signal from the speech circuits, and a second protracted sampling time period for measuring the peak amplitude of each speech circuit signal stored on the signal detecting means.

26. The system in claim 25 wherein the sampling means includes an analog multiplexer and an analog demultiplexer for sequentially sampling each of the plurality of speech circuits and providing output signals representative thereof within the first time period.

27. The system in accordance with claim 26 wherein the multiplexer and demultiplexer have an amplifier connected therebetween, the amplifier having its input sequentially connected to each of a plurality of inputs of the multiplexer for amplifying the respective signals of the speech circuits thereupon and its output alternately connected between each of a plurality of outputs of the demultiplexer, the outputs of the demultiplexer corresponding in number to the input of the multiplexer.

28. The system in accordance with claim 27 wherein the means for sampling comprises a second analog multiplexer with a plurality of inputs for sequentially sampling the signal detecting means in the second time period, the second time period being greater than the first time period.

29. A voice-actuated switching system for selectively connecting video signals from a plurality of cameras with a limited field of view to an output line, the system comprising:
   a plurality of microphones for generating speech signals;
   comparison means automatically operative in response to speech signals from the microphones for selecting that one of the speech signals having the greatest magnitude, the comparison means determining the speech signal with the greatest magnitude by comparing the signals from the microphones both with reference to each other and with reference to a ground potential, the comparing of the signals with the ground potential providing a means for nulling any extraneous signals being induced in the speech signals in determining the speech signal with the greatest magnitude; and means for connecting the selected one of the video signals to the output line, the selected video signal being provided by one of the cameras having a limited field of view so as to identify the microphone having the greatest magnitude speech signal, and the video signal provided to the output line being that of a person speaking into the identified microphone.

30. The system in accordance with claim 29 wherein the comparison means includes an analog multiplexer and an analog demultiplexer for sequentially sampling each of the plurality of speech circuits and the ground reference level and providing output signals representative thereof within a first time period.

31. The system in accordance with claim 30 wherein the multiplexer and demultiplexer have an amplifier connected therebetween, the amplifier having its input alternately connected to each of a plurality of inputs of the multiplexer for amplifying the respective signals of the speech circuits thereupon and measuring the ground reference level at the input of the multiplexer, and its output alternately connected between each of a plurality of outputs of the demultiplexer, the outputs of the demultiplexer corresponding in number to the inputs of the multiplexer.

32. The system in accordance with claim 31 wherein the comparison means further comprises a plurality of peak detectors, each peak detector being associated with one of the speech circuits or the ground reference level and connected to one of the plurality of outputs of the demultiplexer.

33. The system in accordance with claim 32 wherein the comparison means further comprises a second analog multiplexer with a plurality of inputs, each input being connected to one of the plurality of peak detectors for sequentially sampling within a second time period the voltage level representing each of the speech circuit signals stored thereupon or the ground reference level, the second time period being greater than the first time period.

34. The system in accordance with claim 33 wherein the first and second analog multiplexers and the analog demultiplexer in combination provide for the first sampling time period for measuring the signal from the speech circuits and ground reference level, and the second protracted sampling time period for measuring the voltage stored on the peak detectors.

35. The system in accordance with claim 33 wherein the comparison means further comprises an analog-to-digital converter for converting each of the speech circuit signals and the ground reference signal to its respective digital equivalent signal, the analog-to-digital converter having as its input the output of the second analog multiplexer.

36. The system in accordance with claim 35 wherein the comparison means further includes a central processing unit connected to the output of the digital-to-analog converter, the central processing unit comparing each of the digital speech circuit signals with each other and with the digital ground reference level, and selecting that one of the signals having the greatest amplitude above the ground reference level.

* * * * *